(12) United States Patent
Wight et al.

(10) Patent No.: US 6,529,646 B1
(45) Date of Patent: Mar. 4, 2003

(54) OPTICAL MODULATOR

(75) Inventors: David R Wight, Malvern (GB); Nicola Shaw, Abington (GB); William J Stewart, Blakesley (GB)

(73) Assignee: Marconi Caswell Limited, London (GB)

( * ) Notice: Subject to any disclaimer, the term of this patent is extended or adjusted under 35 U.S.C. 154(b) by 0 days.

(21) Appl. No.: 09/647,382

(22) PCT Filed: Feb. 22, 2000

(86) PCT No.: PCT/GB00/00626

§ 371 (c)(1),
(2), (4) Date: Dec. 21, 2000

(87) PCT Pub. No.: WO00/50952

PCT Pub. Date: Aug. 31, 2000

(30) Foreign Application Priority Data

Feb. 23, 1999 (GB) ................................ 9904077

(51) Int. Cl.$^7$ ............................. G02F 1/01; G02F 1/03; G02F 1/07

(52) U.S. Cl. ............................ 385/1; 385/2; 359/247; 359/254

(58) Field of Search ................ 385/1, 2, 3, 8, 385/9, 10; 359/245–248, 254

(56) References Cited

U.S. PATENT DOCUMENTS

| 4,914,407 A | * 4/1990 | Itoh ........................... 333/161 |
| 5,150,436 A | 9/1992 | Jaeger et al. ................... 385/2 |
| 5,903,683 A | * 5/1999 | Lowry ........................... 385/1 |
| 5,970,186 A | * 10/1999 | Kenney et al. ................. 385/16 |
| 6,343,167 B1 | * 1/2002 | Scalora et al. ................. 385/37 |

FOREIGN PATENT DOCUMENTS

| EP | 0 547 859 A1 | 6/1993 |
| GB | 2 262 621 A | 6/1993 |

OTHER PUBLICATIONS

*Optical slow–wave resonant modulation in electro–optic GaAs/AlGaAs modulators*, N. Shaw, et al., Electronics Letters, Sep. 2, 1999, vol. 35, No. 18, p. 1557.
*Enhanced Electrooptic Modulation Efficiency Utilizing Slow–Wave Optical Propagation*, h.f. tAYLOR, fELLOW, ieee, fELLOW, osa, Journal of Lightwave Technology, vol. 17, No. 10, Oct. 1999, pp. 1875–1883.
*Crosstie Overlay Slow–Wave Structure for Broadbrand Traveling–Wave Type Electro–Optical Modulators*, H. Y. Lee, et al., International Journal of Infrared and Millimeter Waves, vol. 9., No. 1, 1988, pp. 87–99.

* cited by examiner

*Primary Examiner*—Georgia Epps
*Assistant Examiner*—William Choi
(74) *Attorney, Agent, or Firm*—Kirschstein, et al.

(57) ABSTRACT

An optical modulator includes an optical input; an optical output; at least one optical path connecting the optical input and output; and an electrode structure for selectively changing the optical characteristic of a part of the at least one optical path in response to a control signal such as to modulate light passing along the optical path. The optical path further includes a structure which slows the passage of light along the part of the optical path to enhance the modulation effect of the modulator for a given length of optical path. Preferably the structure comprises a sequence of coupled resonator structures in which each resonator structure is defined by a pair of partially reflecting planes which define an optical resonator cavity within the optical parts.

11 Claims, 3 Drawing Sheets

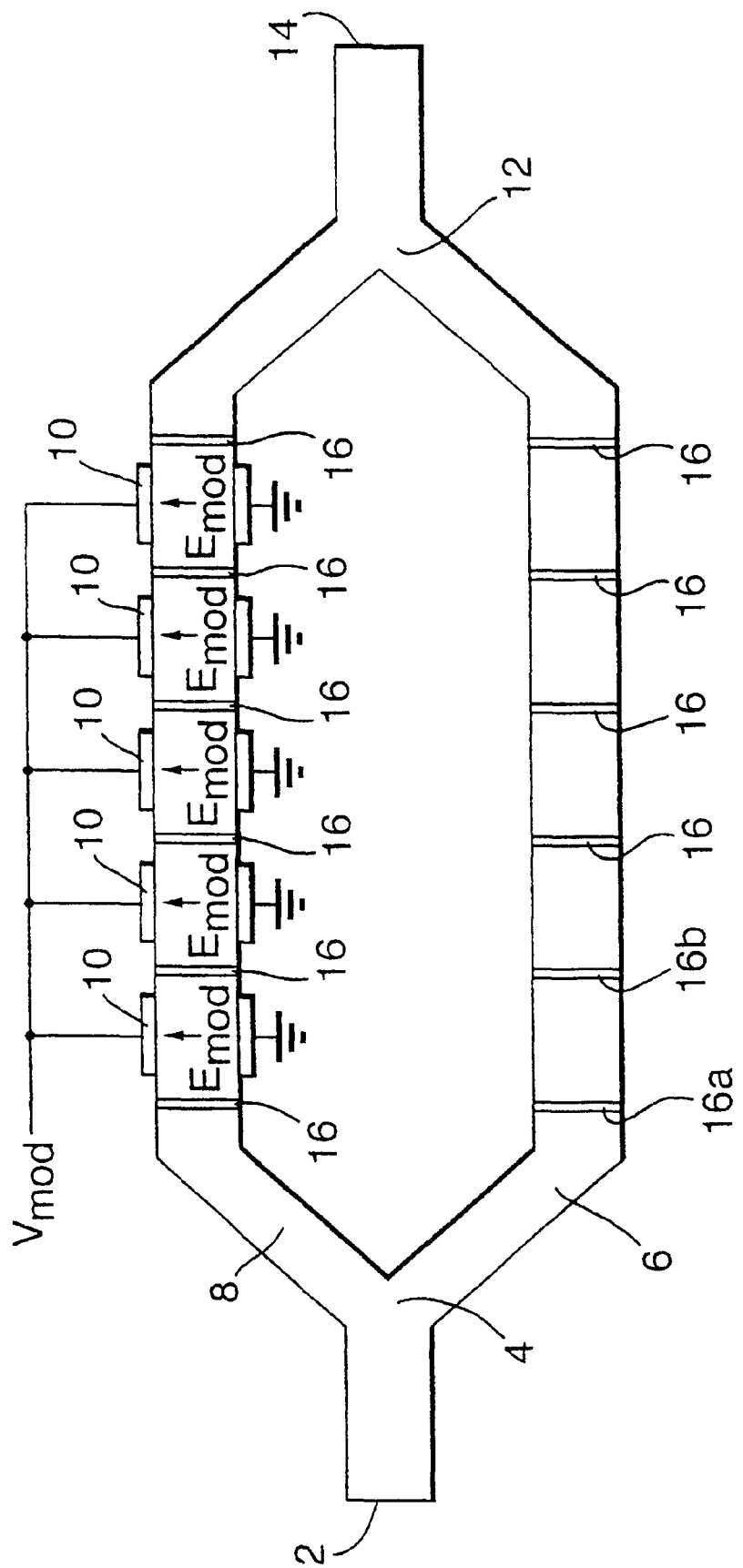

OPTICAL MODULATOR

BACKGROUND OF THE INVENTION

This invention relates to an optical modulator and in particular, although not exclusively, to a waveguide type optical modulator.

Optical modulators are extensively used in optical telecommunication systems to modulate light from a laser source. The optical modulator in response to a modulating signal, which is applied to a control input of the modulator, applies a variable attenuation to the intensity of an optical signal passing through it or changes the phase of the optical signal.

Optical modulators can generally be categorised into two types depending on their principle of operation, these being "resonant" or "non-resonant" modulators. Both types of modulators can be implemented as waveguide or non-waveguide devices. In a waveguide implementation the optical signal(s) is guided along a specific path, or paths, in a specific waveguide mode(s). Modulation of the optical signal is effected by changing the propagation properties of the mode(s) within the waveguide(s). Such modulators tend to be planar devices such as for example the Mach-Zehnder intensity modulator.

In non-waveguide implementations there is a degree of flexibility in the optical pathway through the device, since there is less spatial control over the optical signal. Modulation is again effected by changing the propagation properties of the optical signal in the propagating medium. Examples of such modulators are Fabry-Perot modulators and liquid crystal spatial light modulators.

Resonant modulators operate by changing the resonant wavelength to effect switching between the resonant and non-resonant state at a particular wavelength. This change is achieved by altering the optical phase change of the signal as it passes through an "active" medium (the active medium being the part of the device over which the modulation effect is applied). Modulation can be achieved by using a wide range of physical phenomena such as electro-optical, electromechanical or thermo-optic effects.

One example of a resonant modulator is the Fabry-Perot vertical cavity reflective modulator which is a non-waveguide device. The device comprises two partially reflecting mirrors separated by an "active" medium which is made of an electro-optic material. At certain resonant wavelengths the optical signal is reflected by the first mirror and the device does not transmit light of this wavelength. At other wavelengths the optical signal passes substantially unattenuated through the first mirror, the "active" medium and the second partially reflecting mirror. Modulation of the device is achieved by applying an electric field to the "active" medium between the mirrors to change the effective refractive index of the "active" medium. This change in refractive index has the effect of shifting the resonant wavelength. Thus for an optical signal of fixed wavelength the modulator can be made to switch between reflective and tranmissive states.

Non-resonant modulators operate by modulating the phase and/or the intensity of the optical signal in the "active" medium within the modulator. This switching can be achieved by a wide range of physical phenomena e.g. electro-optic, electro-absorption, electro-mechanical or thermal effects. An example of such a device is the Mach-Zenhder modulator which is an interferometric waveguide device. In this type of modulator the optical signal is split to pass along two optical paths each of which comprises an "active" medium made from an electro-optic material whose refractive index is dependent upon an applied electrical field. The optical output of the device is derived by combining the outputs from the two optical paths. Modulation of the optical output intensity is achieved by changing the phase difference between the optical signals in the two paths of the device, and thereby changing the intensity of the combined optical output.

Important parameters for all types of optical modulators are (i) its efficiency (that is its drive power requirements, (ii) its physical size, (iii) the optical insertion loss it presents to a system in which it is to be used, (iv) its ease of integration into an optical system, (v) the capability to modulate at high data rates, (vi) its ease of manufacture and (vii) its cost. The design of optical modulators is often a compromise to optimise one or more of these parameters.

SUMMARY OF THE INVENTION

The present invention has arisen in an endeavour to provide an optical modulator which is an improvement, at least in part, on the known modulators.

According to the present invention an optical modulator comprises an optical input; an optical output; at least one optical path connecting the optical input and output; means for selectively changing the optical characteristic of a part of the at least one optical path in response to a control signal such as to modulate light passing along the optical path characterised by the optical path including a structure which slows the passage of light along the part of the optical path. Due to the structure within the optical path the interaction time of an optical signal passing along the part of the optical where it is modulated is increased and the modulation effect is thus enhanced.

Advantageously the structure comprises a sequence of coupled resonator structures such as to form an optical slow-wave structure. Conveniently each resonator structure is defined by a pair of partially reflecting planes which define an optical resonator cavity within the part of the optical path. In a preferred implementation each of the partially reflecting planes is defined by a grating structure.

Preferably the optical path comprises an electro-optic material whose refractive index is dependent upon an applied electrical field and wherein the means for changing the optical characteristic comprises electrodes for applying an electric field to the material.

Alternatively the optical path comprises an electro-absorption material whose optical absorption is dependent upon an electrical field and wherein the means for changing the optical characteristic applies an electric field to the material.

As a further alternative, the optical path comprises a thermo-optic material whose optical properties are dependent upon temperature and wherein the means for changing the optical characteristics changes the temperature of the material.

In a preferred implementation the modulator further comprises a second optical path; an optical splitter for splitting the optical signal to pass along the first and second optical paths; an optical combiner for combining the optical signals from the paths to form the optical output wherein each of the optical paths comprises an electro-optic material whose refractive index is dependent on electrical field and the means for changing the optical characteristics applies different electrical fields to the two paths.

Advantageously when the modulator is an electro-absorption or electro-optic device the means for changing the optical characteristics comprises a plurality of electrodes disposed along the, or each, optical path in a direction of propagation of light along the, or each, optical paths such that the electrical field travels along said path or paths and wherein the velocity of the travelling electrical field and slow-wave optical signal are matched.

In any of the embodiments, the optical path(s) is (are) defined by a waveguide.

BRIEF DESCRIPTION OF THE DRAWINGS

In order that the invention may be better understood an optical modulator in accordance with the invention will now be described by way of example only with reference to the accompanying drawings in which:

FIG. 1 is a schematic of an optical modulator in accordance with the present invention;

DETAILED DESCRIPTION OF THE PREFERRED EMBODIMENTS

Figure 2A:
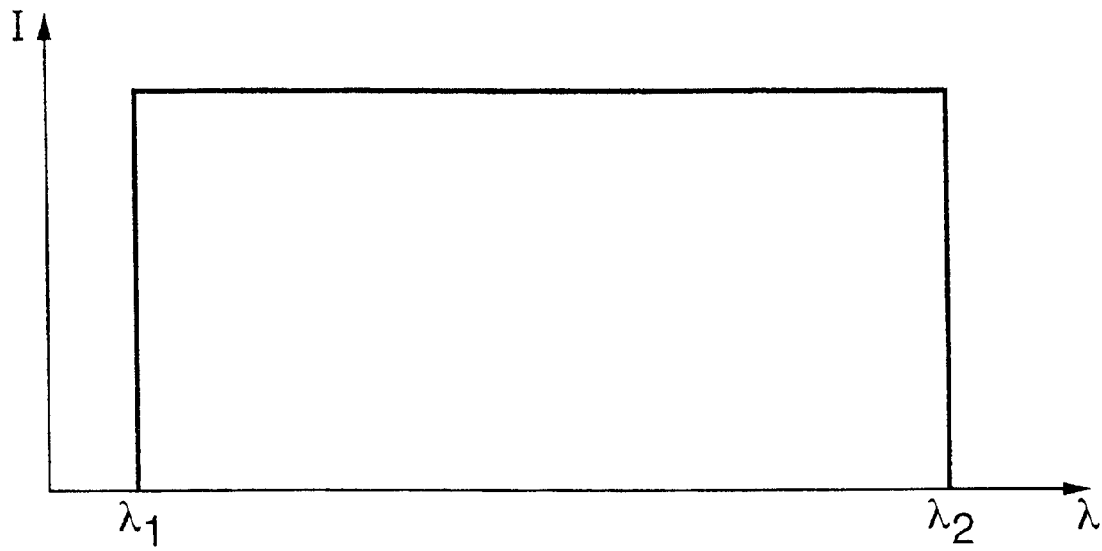
FIG. 2 is a plot of optical transmission (intensity I) versus wavelength $\lambda$ for (a) the optical medium and (b) the optical medium incorporating a slow-wave structure.

Referring to FIG. 1 there is shown an optical modulator in accordance with the invention which comprises an optical input 2 to which an optical signal to be modulated is applied. The optical signal is divided by an optical splitter 4 into respective optical signals which pass along two optical paths 6 and 8. The optical paths 6 and 8 which comprise the active medium of the modulator are identical and are made from an electro-optic material whose refractive index is dependent upon electrical field. Along the path 4 a segmented electrode arrangement 10 is provided for applying an electric field and hence changing the refractive index of the optical path 4 in response to a modulating electrical signal $v_{mod}$. The optical signals which pass along the optical paths 6 and 8 are recombined by an optical combiner 12 to form an optical output 14. The application of the modulating signal $v_{mod}$ has the effect of changing the refractive index of the path 8 relative to that of the optical path 6 such that the phase relationship of the respective optical signals is altered. By selecting an appropriate magnitude of modulating voltage signal it is possible to ensure that when the optical signals are recombined to form the optical output they are in anti-phase and destructive interference occurs which results in no light output. Conversely when no modulating voltage (or a voltage which causes a phase shift equal to one or more wavelengths) is applied the two optical signals will be in phase and hence light will pass from the optical input 2 to the optical output 14 substantially unattenuated. It will be appreciated that in a practical implementation the segmented electrode structure 10 is provided on both optical paths 6, 8 and different electrical fields are applied to each to optimise the modulating effect. For clarity however only one electrode structure is shown. The device described so far is of a known arrangement and is often termed a Mach-Zehnder optical modulator.

In contrast to the known modulators, the modulator of the present invention further comprises within each optical path 6 and 8 a plurality of partially reflecting planes 16 which, in conjunction with the active medium of the optical paths, form what will hereinafter be referred to as an optical slow-wave structure. The optical slow-wave structure has the effect of slowing the passage of light at a given wavelength through the active medium. Optical slow-wave structures are known and have been disclosed in our UK Patent No: GB 2,262,621 which is hereby incorporated by way of reference thereto.

The optical slow-wave structure shown in FIG. 1 comprises a series of coupled optical resonators which extend in a direction of propagation of the optical signal. Each optical resonator comprises an adjacent pair of partially reflecting planes(within the Figure one pair is indicated as 16a, 16b) which extend in a direction which is transverse to the direction of propagation of the optical signal. Each pair of partially reflecting planes 16a, 16b define an optical resonator cavity within the active medium. In FIG. 1 six partially reflecting planes 16 within each optical path 6, 8 are shown and thus the optical slow-wave structures comprises five series coupled optical resonators in each path. Typically between ten and twenty optical cavities are required within each optical path 6, 8 to obtain the desired optical slow-wave effect.

In a preferred implementation each partially reflecting plane is defined by a grating structure having a pitch of $\lambda_R/2n$ such that it forms a partial reflecting plane at the wavelength $\lambda_R$. Although the optical resonators or cavities are conveniently formed by the plurality of partially reflecting planes 16, the same effect can be achieved by using a continuous distributed reflector with a series of regular discontinuities such as the Moiré grating structure disclosed in GB 2,262,621. In such a structure the optical cavities are formed at the discontinuities.

Figure 2B:
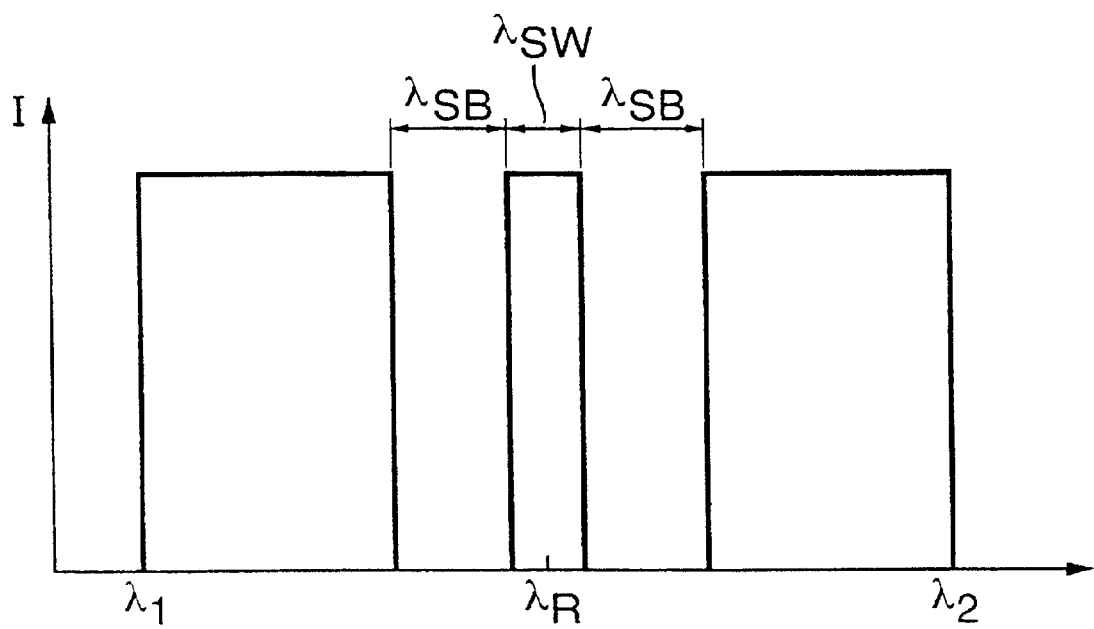

The optical signals travel through the slow-wave structure in their respective optical path by hopping from one resonator cavity to the next such that the effective average group velocity through each optical resonator cavity is reduced compared to that of the plain medium. The optical slow-wave structure thus has the effect of producing an optical slow-wave of wavelength $\lambda_R$. FIG. 2(a) shows the optical transmission spectrum of the active medium which comprises a pass band between wavelengths $\lambda_1$ and $\lambda_2$ and FIG. 2(b) the transmission spectrum (intensity versus wavelength) of the active medium incorporating the slow-wave structure (i.e. the optical path 6, 8). As will be seen from the figure the optical slow-wave structure has the effect of modifying the spectrum such that it comprises an optical slow-wave pass band, of bandwidth $\lambda_{sw}$, flanked by optical stop bands of bandwidth $\lambda_{sb}$. The stop band bandwidth $\lambda_{sb}$ and slow-wave pass band bandwidth $\lambda_{sw}$ are determined by the parameters of the structure (i.e. the length and number of cavities, the refractive index etc). Since the optical signal takes longer in travelling across each optical resonator cavity (it will be appreciated that in reality the optical signal travels at the same velocity within the cavity but traverses a number of times) it spends a longer time within the active medium where the modulation effect is being applied. As a result the modulation effect is enhanced and it is thus possible for a given voltage to make a smaller optical modulator which has the same performance. Alternatively the same size structure can be used and a lower operating voltage.

Although the increase in the interaction time in the "active" medium of an optical signal at the slow-wave wavelength is achieved at the expense of a reduction in the optical bandwidth of the device (the optical bandwidth of the device has been effectively reduced from the optical bandwidth of the medium $\lambda_1$–$\lambda_2$ to that of the slow-wave pass band $\lambda_{sw}$) this does not necessarily have a detrimental effect when the device is used in most practical applications. This is because the optical bandwidth of the optical carrier through the device is still substantially greater than the modulation frequency.

Figure 3:
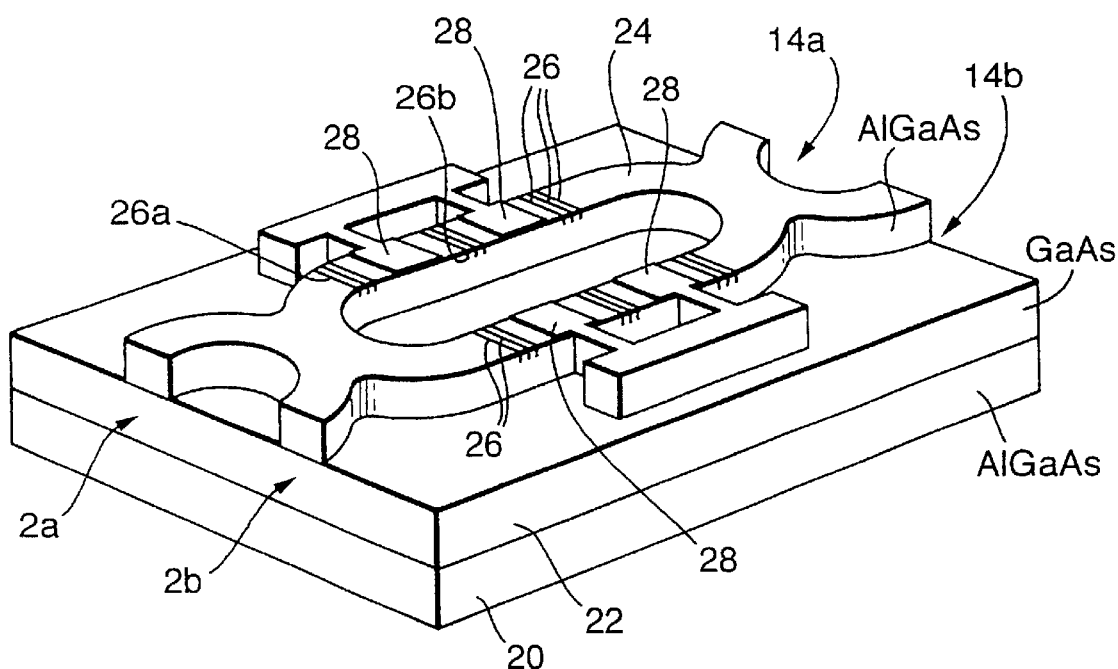
FIG. 3 is a schematic representation of one implementation of the optical modulator of FIG. 1.

Referring to FIG. 3 there is shown a schematic representation of one implementation of an optical modulator in accordance with the invention. The device comprises a substrate 20 of aluminium gallium arsenide (Al GaAs) on to which a layer 22 of gallium arsenide (GaAs) of higher refractive index is formed. The GaAs layer 22 forms the "active" optical medium and the optical paths 6 and 8 are defined within this layer by a rib-loaded waveguide structure 24, made of Al GaAs, which is provided on the surface of the GaAs layer 22. In a known manner the Al GaAs rib structure loads the optical medium 22 such that light propagates through the medium 22 in a guided manner along paths corresponding with those of the rib structure. Likewise the optical splitter 8 and coupler 12 are defined as part of the rib structure 24 and each is formed as a 3dB coupler such that the device has two inputs 2a, 2b and two outputs 14a, 14b.

The slow-wave structure is formed by a series of groups of notches 26 in the respective arms of the rib structure 24. Each notch 26 runs in a direction which is transverse to the direction of propagation of light through the modulator. Within each group the notches 26 are spaced a distance $\lambda_R/2n$ apart and each group defines a partial reflecting plane within the active medium 22 by the rib loading effect. Adjacent groups of notches 26a, 26b define the optical resonator cavity of the slow-wave resonator structure.

Deposited on the flat surfaces of each arm of the rib structure 24 between the groups of notches 26 is a segmented electrode structure 28 which in conjunction with an electrode on the substrate 20 is used to apply the modulating electric field to the GaAs layer 22. In this embodiment it will be appreciated that different electric fields are applied to the optical paths 6, 8.

With the implementation of the optical modulator shown improvements in electro-optic efficiencies by factors of between 1.6 and 2.9 have been achieved (i.e. the optical signal spends 1.6 to 2.9 times as long in the active medium). Thus for the same drive voltage the device can be made approximately one half to one third ($1/1.6$ to $1/2.9$) the size or alternatively for a given size the drive power can be reduced by the same factor. The modulator described has the form of a travelling wave electrode structure to produce an electrical slow-wave which travels in a direction corresponding with the optical path. The use of such an electrode structure with the optical slow-wave structure is particularly advantageous since the velocity of the travelling electrical signal applied to the segmented electrodes and the optical signal velocity (that is the velocity at which the optical signals pass along the paths) can be matched to optimise the modulator's performance.

It will be appreciated that the present invention is not restricted to the embodiment specifically shown in the figures. For example the invention is applicable to all types of modulators where the magnitude of modulation is dependent upon the interaction time in an "active" medium and is thus applicable to both waveguide and non-waveguide type modulators which modulate both intensity and/or the phase. The inventors believe that the present invention resides in the incorporation of an optical slow-wave structure into the active optical propagating medium of an optical modulator to enhance the modulation efficiency wherein; the active medium is that part of the optical medium over which the modulation effect is applied. It will be appreciated therefore that other types of structures can be used within the optical medium provided they increase the interactive time of light travelling within the medium. It should be noted that such an arrangement does not produce a resonant modulator (though of course the slow-wave resonator structure described does rely on a resonance effect) but rather enhances the non-resonant modulation at the optical slow-wave wavelength $\lambda_R$. It will further be appreciated that the invention can be applied to modulators which use other methods of effecting the modulation such as, for example, an electro-absorption, thermo-optic or resonant type modulation effect. Furthermore, it is envisaged to apply the invention to reflective modulators, in which case the optical input and output are one and the same.

What is claimed is:

1. An optical modulator, comprising:
   a) an optical input;
   b) an optical output;
   c) an optical path for connecting the optical input and the optical output;
   d) means for selectively changing an optical characteristic of a part of the optical path in response to a control signal such as to modulate light passing along the optical path; and
   e) an optical slow wave structure incorporated in the optical path and comprising a sequence of coupled resonator structures, for slowing passage of the light along the part of the optical path.

2. The optical modulator according to claim 1, in which each resonator structure is defined by a pair of partially reflecting planes which define an optical resonator cavity within the part of the optical path.

3. The optical modulator according to claim 2, in which each partially reflecting plane is defined by a grating structure.

4. The optical modulator according to claim 1, in which the optical path comprises an electro-optic material whose refractive index is dependent upon an applied electrical field, and in which the means for changing the optical characteristic comprises electrodes for applying the electrical field to the material.

5. The optical modulator according to claim 1, in which the means for changing the optical characteristic comprises a plurality of electrodes for applying an electrical field, the electrodes being disposed along the optical path in a direction of propagation of the light along the optical path such that the electrical field travels along the optical path, and in which the electrical field travels at a velocity, and in which the light travels at a velocity along the part of the optical path, and in which the velocities are matched.

6. The optical modulator according to claim 1, and further comprising a further optical path, and in which the means for changing the optical characteristic comprises a plurality of electrodes for applying an electrical field to each optical path, the electrodes being disposed along each optical path in a direction of propagation of the light along each optical path such that the respective electrical field travels along each optical path, and in which each electrical field travels at a velocity, and in which the light travels at a velocity along each optical path, and in which the velocities are matched.

7. The optical modulator according to claim 1, in which the optical input and the optical output are one and the same.

8. The optical modulator according to claim 1, in which the optical path is defined by a waveguide.

9. An optical modulator, comprising:
   a) an optical input;
   b) an optical output;
   c) an optical path comprising an electro-absorption material whose optical absorption is dependent upon an electrical field, for connecting the optical input and the optical output;

d) means for selectively changing an optical characteristic of apart of the optical path in response to a control signal such as to modulate light passing along the optical path, the changing means being operative for applying the electrical field to the material; and e) a structure incorporated in the optical path, for slowing passage of the light along the part of the optical path.

10. An optical modulator, comprising:

a) an optical input;

b) an optical output;

c) an optical path comprising a thermo-optic material whose optical properties are dependent upon temperature, for connecting the optical input and the optical output;

d) means for selectively changing an optical characteristic of a part of the optical path in response to a control signal such as to modulate light passing along the optical path, the changing being operative for changing the temperature of the material; and e) a structure incorporated in the optical path, for slowing passage of the light along the part of the optical path.

11. An optical modulator, comprising:

a) an optical input;

b) an optical output;

c) an optical path for connecting the optical input and the optical output;

d) means for selectively changing an optical characteristic of a part of the optical path in response to a control signal such as to modulate light passing along the optical path;

e) a structure incorporated in the optical path, for slowing passage of the light along the part of the optical path;

f) a further optical path;

g) an optical splitter for splitting the light to pass as optical signals along the optical paths;

h) an optical combiner for combining the optical signals from the optical paths to form the optical output;

i) each of the optical paths comprising an electro-optic material whose refractive index is dependent on an applied electrical field; and j) the means for changing the optical characteristic being operative for applying the electrical field to each optical path, the electrical field being different for each optical path.

* * * * *